United States Patent
Lindsay et al.

(10) Patent No.: US 9,916,602 B2
(45) Date of Patent: Mar. 13, 2018

(54) BATCH IMAGE PROCESSING TOOL

(71) Applicant: CONVERSANT, INC., Chicago, IL (US)

(72) Inventors: Andrew Lindsay, Glenview, IL (US); Noe Huerta, Chicago, IL (US); Shatay Zoe Trigere, Chicago, IL (US); Leah Whittaker, Chicago, IL (US)

(73) Assignee: Conversant, Inc., Chicago, IL (US)

( * ) Notice: Subject to any disclaimer, the term of this patent is extended or adjusted under 35 U.S.C. 154(b) by 319 days.

(21) Appl. No.: 14/696,173

(22) Filed: Apr. 24, 2015

(65) Prior Publication Data

US 2016/0314503 A1  Oct. 27, 2016

(51) Int. Cl.
*G06Q 30/00* (2012.01)
*G06Q 30/02* (2012.01)

(52) U.S. Cl.
CPC ..... *G06Q 30/0276* (2013.01); *G06Q 30/0277* (2013.01)

(58) Field of Classification Search
CPC .................................. G06Q 30/0276
See application file for complete search history.

(56) References Cited

U.S. PATENT DOCUMENTS

| | | | |
|---|---|---|---|
| 8,311,900 B1* | 11/2012 | Bates | G06Q 30/0601 705/27.1 |
| 2002/0036654 A1* | 3/2002 | Evans | G06F 17/243 715/744 |
| 2003/0234955 A1* | 12/2003 | Chalstrom | G06Q 30/02 358/1.15 |
| 2006/0139371 A1* | 6/2006 | Lavine | G06F 3/14 345/620 |
| 2010/0060547 A1* | 3/2010 | Bloebaum | G06F 1/1624 345/1.3 |
| 2010/0106498 A1* | 4/2010 | Morrison | G10L 15/265 704/235 |
| 2011/0004533 A1* | 1/2011 | Soto | G06Q 30/00 705/27.1 |

* cited by examiner

*Primary Examiner* — Bennett M Sigmond
*Assistant Examiner* — Scott C Anderson
(74) *Attorney, Agent, or Firm* — Blank Rome LLP

(57) ABSTRACT

A tool provides for the batch processing of assets that will be utilized across multiple ad sizes, allowing quickly and simultaneously reformatting assets into multiple standard online advertisement formats so as to save time and cost in generating an online advertising campaign. The tool may include high level commands to allow a user to simultaneously or individually adjust an asset for different renderings for an online advertising campaign. The tool may also allow a user to adjust multiple assets simultaneously for different renderings for an online advertising campaign.

20 Claims, 10 Drawing Sheets

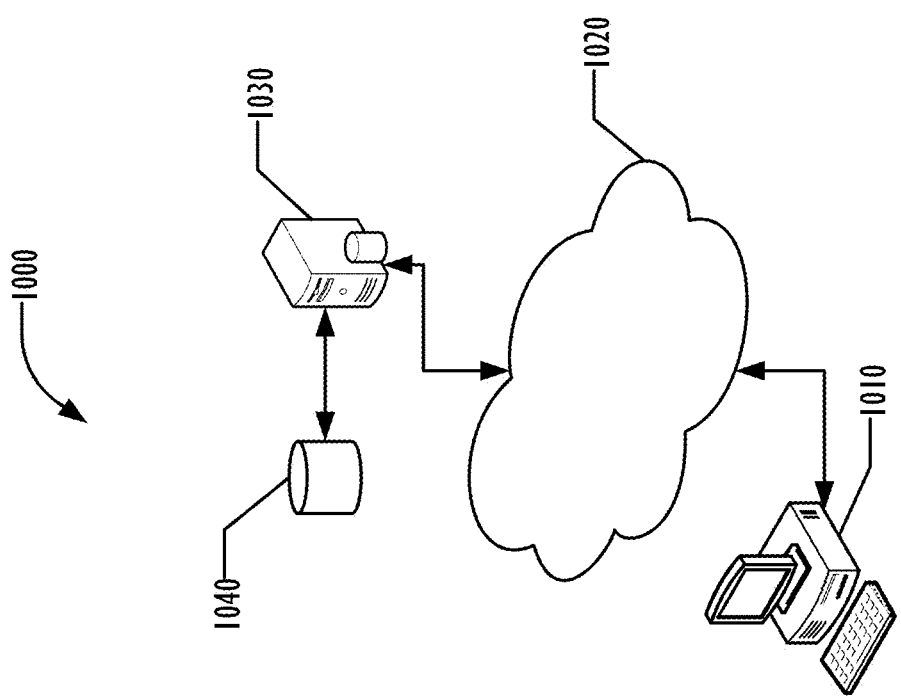

BATCH IMAGE PROCESSING TOOL

TECHNICAL FIELD

This is an application which streamlines the design and asset generation process of multiple advertising units. Specifically, the invention allows the user to process multiple ad units in unison within a single concentrated view which is then exported as web-optimized assets (e.g., jpg or png files) which are then loaded into an adserver.

BACKGROUND ART

Web developers, web designers, and bloggers frequently have to deal with the challenge of converting many images to different sizes and formats. While production artists and others of ordinary skill in the art know how to convert such assets by hand, the process to do so can be extremely time consuming. Batch image processing such as that provided for by the present invention can reduce this process from hours of work to just a few simple clicks. Moreover, an automated batch process to create such images provides much greater flexibility to meet desired changes in the advertisements over time.

Thus, the present state of the art reflects a need for a system which easily permits a user flexible batch processing tools for assets related to advertisements for an online advertising campaign.

One example of a prior art approach is found in the Pixillion Image Converter software from Pixillion Limited. The Pixillion software can convert images, resize and rotate them, adjust the quality of JPEG files, add captions, and the like. Another example can be seen in the Advanced Batch Converter software from Gold Software. Advanced Batch Converter can convert from over 180 file types into 44 common file formats (including jpg, png, and tiff). It can also resize, rotate, flip, mirror, crop, filter, watermark, or perform other functions on images.

However, none of these prior art approaches permit a user to ability to implement the simultaneous batch processing of multiple ad units for placement on the same page that includes the adjustment of multiple individual assets within a given advertisement.

What is needed is simple, user friendly solution for the flexible and simultaneous processing of the placement, size, and layer compositions of multiple advertisements within an online advertising system.

SUMMARY OF INVENTION

Embodiments disclosed herein generally include a tool for the batch processing of multiple advertisements, allowing quickly and simultaneously reformatting assets into multiple standard online advertisement formats so as to save time and cost in generating an online advertising campaign. The tool may include high level commands to allow a user to simultaneously or individually adjust an asset for different renderings for an online advertising campaign.

The tool may also allow a user to adjust multiple assets simultaneously for different renderings for an online advertising campaign.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

FIG. 10 is a block diagram that illustrates a networked system employing the batch processing tool according to one embodiment.

DESCRIPTION OF EMBODIMENTS

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although generally described in terms of advertising, the techniques disclosed herein could be applied to other fields where expedited batch processing for of images into multiple sizes and formats.

Definition of Terms

As used herein, the following terms have the meanings set forth below.

An "asset" means a static image that may be used in an advertisement. An asset may have multiple image layers.

An "artboard" means a workspace in an application for manipulating assets. Embodiments may allow for multiple artboards to be used on a single canvas.

A "canvas" is a workspace for manipulating artboards. A canvas may be implemented as a window or panel in an application.

A "computer system" means a single computer or a plurality of computers working together to perform the function described as being performed on or by a computer system.

A "creative" is one or more assets for use in an advertising campaign.

A "machine readable medium" means a single physical medium or a collection of physical media units that together embody an object.

A "processor" means one or more than one processing units or cores providing the capability to execute instructions. The processor may be implemented on a single chip or on multiple chips.

Figure 1:
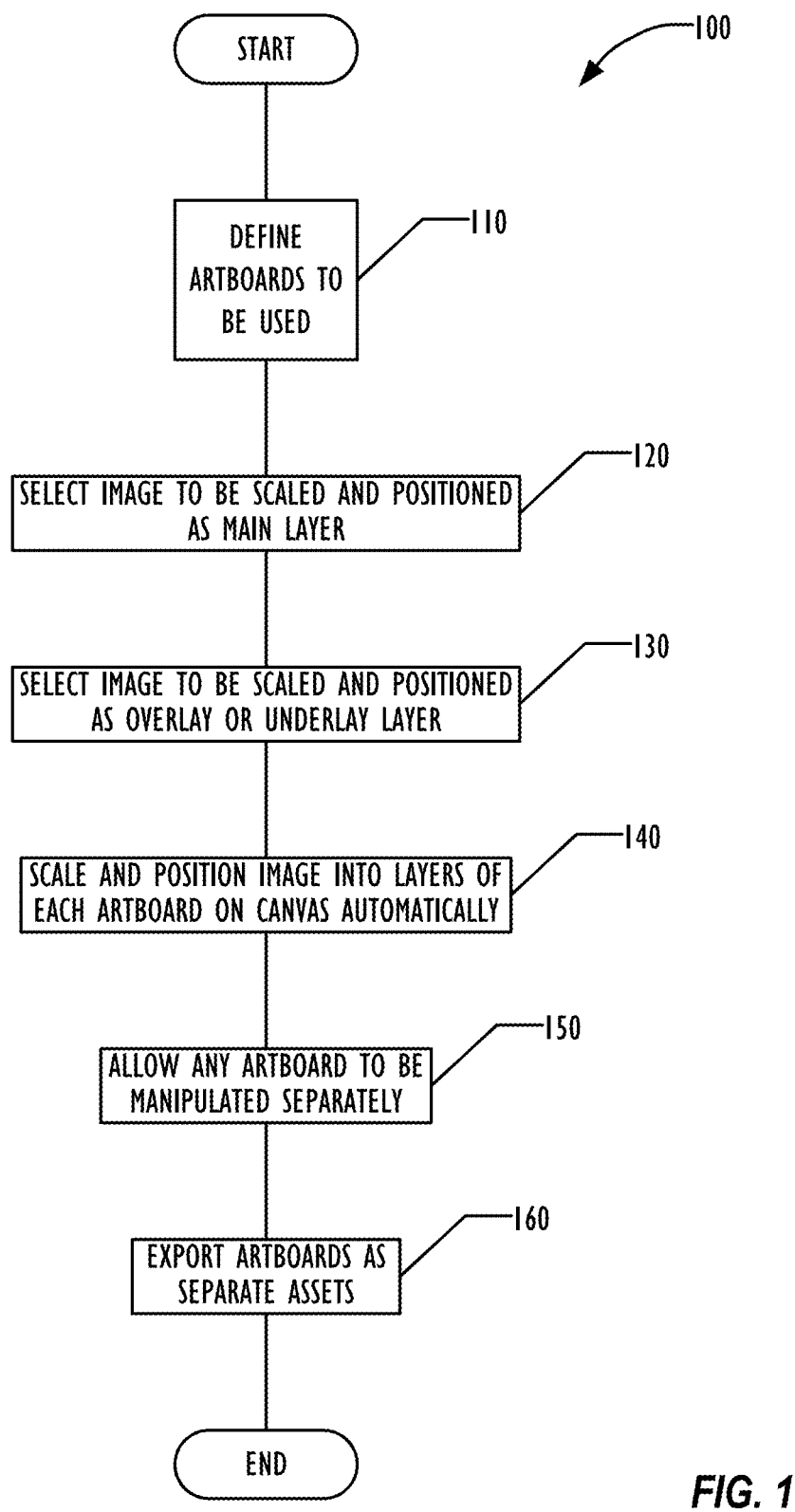
FIG. 1 is a flowchart illustrating a technique for automatically scaling and positioning an asset into multiple pre-defined sizes according to one embodiment.

FIG. 1 is a flowchart 100 generally illustrating a technique for creating multiple ad size assets from a single asset in a single operation according to one embodiment. In block 110, a user defines ad sizes to be placed as artboards on the artboard canvas. Standard sizes defined by the IAB may be used and custom special-purposes sizes may also be defined. In block 120, the user selects an image to be scaled and positioned into the artboards on the canvas. In block 130, underlays or overlays may be selected, as well. In block 140, the selected image or images are placed in the artboards, automatically scaling, cropping, and positioning the images as described below. In block 150, individual artboards may be manually manipulated using the controls described below as desired. Finally in block 160, the assets in the artboards may be exported or saved into creatives files for later serving by an ad server.

Although as generally described below, a single asset image file is batch processed into a collection of assets of different ad sizes, embodiments of the tool may be implemented to batch process multiple original asset image files into multiple collections of assets of different ad sizes, providing even greater utility for the user.

Figure 2:
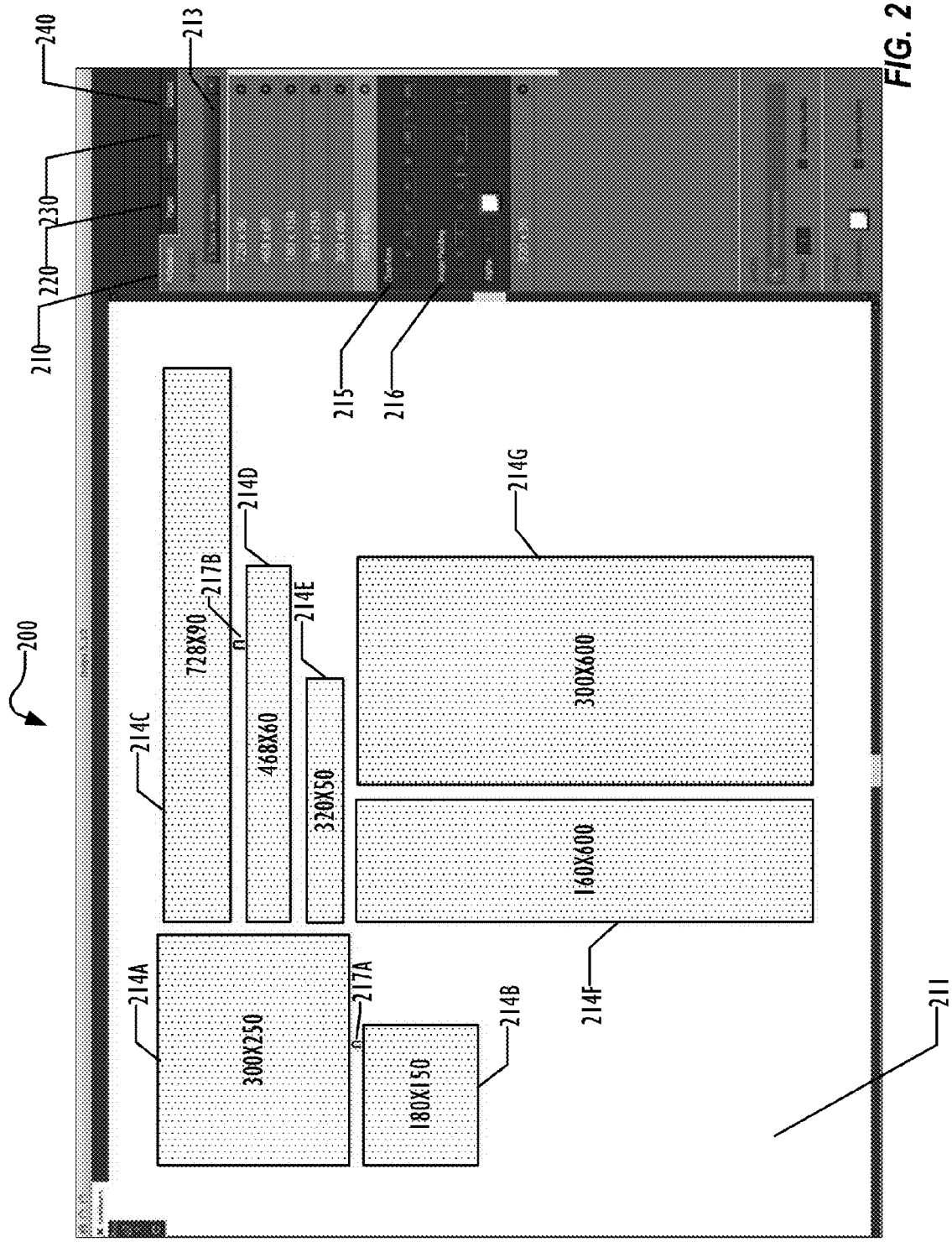
FIG. 2 is a screenshot that illustrates an introductory screen bearing the graphical user interface of a batch processing tool in accordance with one embodiment.

FIG. 2 is a screenshot that illustrates an introductory screen 200 of a graphical user interface of an embodiment of a batch processing tool. Introductory screen 200 is accessed after a login screen (not shown) and after connecting to a server (not shown in FIG. 2) for accessing various advertisements for manipulation as described below. The introductory screen 200 includes an untitled artboard tab 210 which, when selected, presents an artboard panel or canvas 211, which can be deselected by tabs for pages 220, layers 230 and output 240. The artboard panel 211 provides an ad size customization tab 213. Collectively, these components allows a user to custom select the sizes of the advertisements to be rendered, or to select any one of a number of standard sets of sizes as established (for instance) by the Interactive Advertising Bureau (IAB), by the targeted device upon which the advertisement will be shown (e.g., a mobile device), or any one of a number of standards established by various publishers in the online advertising industry. The specific user interface elements illustrated in FIG. 2 are illustrative and by way of example only, and other user interface elements may be used to achieve the disclosed functionality as desired. Different implementations may use user interface elements that are appropriate for an operating system of the computer system. For example, a Microsoft Windows® implementation may use different user interface elements than an Apple® OS X® implementation. (WINDOWS is a registered trademark of Microsoft Corporation. APPLE and OS X are registered trademarks of Apple Inc.)

In one embodiment, the artboards 214 for the selected sizes of advertisements are automatically positioned on the artboard canvas 211. In some embodiments, a user may reposition the artboards as desired on the artboard canvas 211.

In one embodiment, the available ad sizes may be a collection of preset sizes for individual types of creatives that require pre-determined sizes. For example, an embodiment may offer a "Facebook" selection, which if selected will only show Facebook® ad sizes. (FACEBOOK is a registered trademark of Facebook, Inc.) Once the user has selected the sizes of the assets to be rendered on the artboard panel 211, the artboard tab 210, when selected, presents artboards 214 where the image cropping occurs. In the example of FIG. 2, seven artboards 214A-214G are illustrated, one for each ad size to be used. As illustrated in FIG. 2, the numbers on the blank spaces of the artboards 214 corresponding to the selected sizes, i.e., the dimensions of the ad size that the image for which the image is being cropped.

In one embodiment, each ad size displayed on the artboard panel 211 may be separately cropped and padded using crop area selection buttons 215, which can be used to crop an advertisement to smaller than the full frame of the ad size selected, and image padding buttons 216, which can be used to add an interior border to a full frame image, or to produce a smaller than full frame image with a border. In the example of FIG. 2, buttons 215 and 216 are applied to the 260×700 artboard 214F.

The artboard panel 211 may also include one or more magnet tools 217, which copy and scale up or down the same cropping from the artboard 214 on the closed end of the magnet to the artboard 214 on the open end of the magnet (in the example of FIG. 2, magnet tool 217A copies from artboard 214A to artboard 214B and magnet tool 217B copies from artboard 214C to artboard 214D). These magnet tools may be dragged on the artboard panel 211 to the appropriate locations, or may be configured using other user interface techniques.

The magnet tool 217 allows automatically cropping and scaling an image so that the cropped and scaled image is reproduced proportionately in artboards 214 corresponding to advertisements of different sizes. Scaling is performed without regard to the content in the image. Thus, for example, a cropped image in 400×250 artboard 214A may be automatically transferred into the 280×250 artboard 214B; similarly, a cropped image in 828×90 artboard 214C may be automatically transferred into 568×60 artboard 214D, both with appropriate scaling. The following is an example embodiment of code that enables the transfer of cropping details from one artboard 214 to another:

```
for (var j:int = 0; j < __ads.length; j++) {
  if(__ads[j].visible == true)
  {
    __transformManager.deselectAll( );
    var de:DisplayImage;
    for (var i:int = 0; i < __ads[j].displayElements.length; i++)
    {
      de = __ads[j].displayElements[i];
      if (de.isMainImage == true &&
    __transformManager.getItem(de).enabled == true)
      {
        var oldScale:Number = de.scaleX;
        var newScale:Number;
        var newScaleWidth:Number;
        var newScaleHeight:Number;
        if (de.loader && de.loader.bitmap)
```

-continued

```
        {
          newScaleWidth = areaW / de.loader.bitmap.width;
          newScaleHeight = areaH / de.loader.bitmap.height;
          if (newScaleWidth > newScaleHeight)
          {
            newScale = newScaleWidth;
          } else {
            newScale = newScaleHeight;
          }
          __transformManager.selectedTargetObjects = [de];
          __transformManager.scaleSelection(newScale/oldSc
    ale, newScale/oldScale, true);
          de.x = centerX − de.width/2;
          de.y = centerY − de.height/2;
        }
      }
    }
    __transformManager.deselectAll( );
  }
}
```

In one embodiment, a native menu item and corresponding keyboard shortcut designated "Auto Scale and Align" automatically scales and positions the images in all artboards 214 to a recommended crop. This allows the user to make manual cropping adjustments only where needed, rather than starting from a full-size, unpositioned image.

An example embodiment of code which calculates such recommended crops is as follows:

```
/**
 * Auto scales and centers the image similar to scale outside.
 *
 * @param areaW The width of the cropping area.
 * @param areaH The height of the cropping area.
 * @param centerX An optional x location for the center of the
auto-adjusted image
 * @param centerY An optional y location for the center of the
auto-adjusted image
 *
 * @return void
 **/
public function setAutoPlacement(areaW:Number, areaH:Number,
centerX = null, centerY = null):void
{
  __transformManager.deselectAll( );
  var de:DisplayImage;
  for (var i:int = 0; i < __displayElements.length; i++)
  {
    // only want to scale the middle layer and only want to scale it if it's
    not a locked
layer
    if (__displayElements[i].isMainImage == true &&
__transformManager.getItem(__displayElements[i]).enabled == true)
    {
      var oldScale:Number = __displayElements[i].scaleX;
      var oldX:Number = __displayElements[i].x;
      var oldY:Number = __displayElements[i].y;
      var newScale:Number;
      var newScaleWidth:Number;
      var newScaleHeight:Number;
      // make sure that the layer has an image in it
      if (__displayElements[i].loader &&
__displayElements[i].loader.bitmap)
      {
        de = __displayElements[i];
        newScaleWidth = areaW / de.loader.bitmap.width;
        newScaleHeight = areaH / de.loader.bitmap.height;
        if (newScaleWidth > newScaleHeight)
        {
          newScale = newScaleWidth;
        } else {
          newScale = newScaleHeight;
        }
        __transformManager.selectedTargetObjects =
[__displayElements[i]];
```

-continued

```
        __transformManager.scaleSelection(newScale/oldScale,
newScale/oldScale, true);
        // if no center location is provided, just center it in the middle of
the crop area
        if (centerX == null && centerY == null)
        {
          __container.dispatchEvent(new
InigoEvent(InigoEvent.POSITION_CHANGE, {id:_id,
position:Alignment.MIDDLE_CENTER, sendToUndo:false}, true));
        // otherwise center it over the provided coordinates
        } else {
          __displayElements[i].x =   centerX −
__displayElements[i].width/2;
          __displayElements[i].y = centerY −
__displayElements[i].height/2;
        }
      }
    }
  }
  __transformManager.deselectAll( );
```

Figure 7:
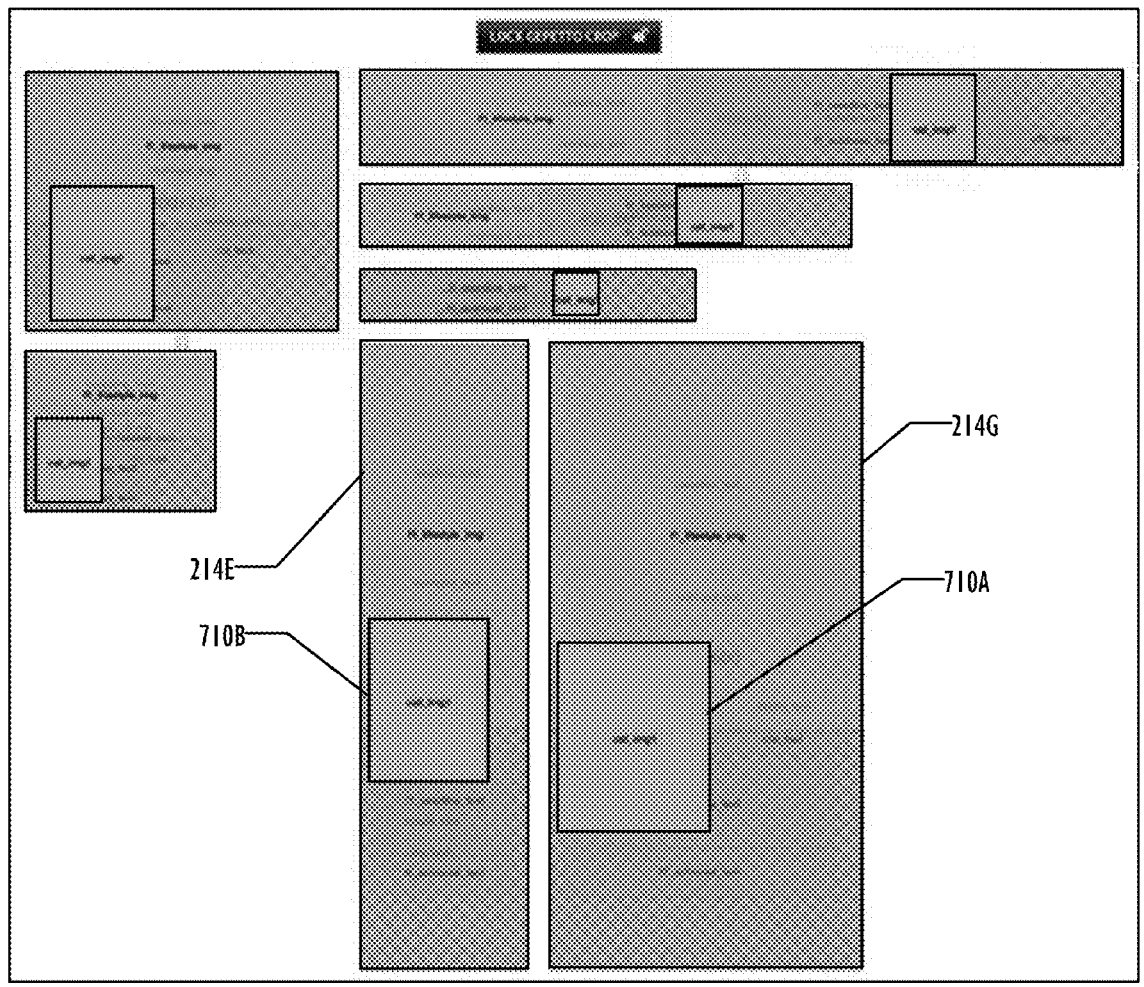
FIG. 7 is a screenshot that illustrates a complementary tool for the scaling of renderings for use with the batch processing tool in accordance with another embodiment.

The above code samples are illustrative and by way of example only, and other techniques may be used to implement scaling and copying a cropped image between two artboards 214. An alternative scaling control is shown in FIG. 7, by which a user using a tool with scaling code similar to that set forth above can "drag and drop" a composed and cropped asset from one artboard 214 to another, automatically transferred using the correct scale or size. In the example illustrated in FIG. 7, a cropped asset 710A in artboard 214G may be dragged and dropped into artboard 214E, producing an appropriately cropped and scaled asset 710B. This template tool is discussed in greater detail in co-pending U.S. patent application Ser. No. 14/696,158, entitled "SYSTEM AND METHOD FOR STREAMLINING THE DESIGN AND DEVELOPMENT PROCESS OF MULTIPLE ADVERTISING UNITS," filed Apr. 24, 2015, owned by the applicant of the present invention, and which is incorporated by reference herein in its entirety for all purposes.

Figure 3:
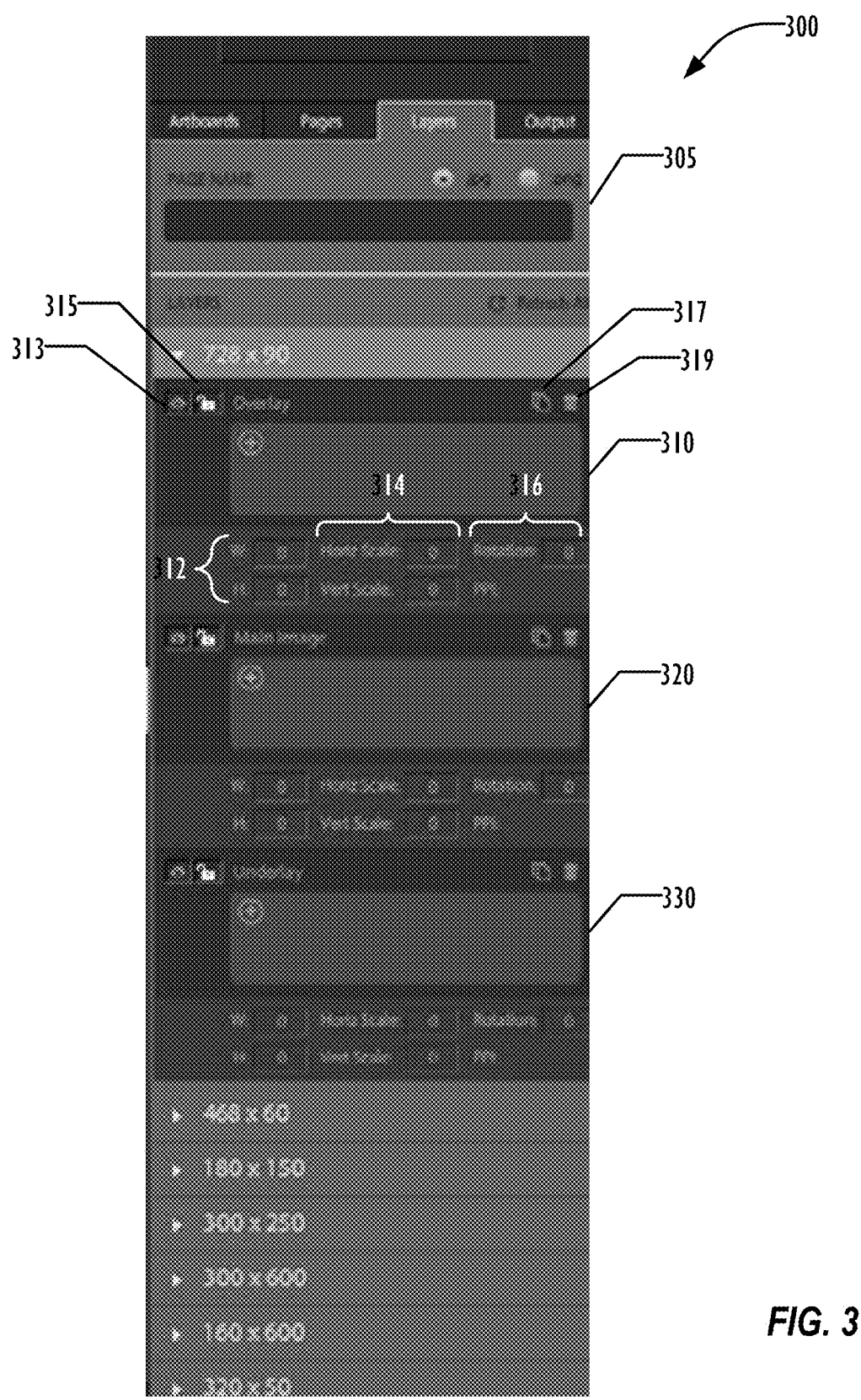
FIGS. 3-5 are screenshots that illustrate a user interface panels of a batch processing tool in accordance with one embodiment.
Figure 4:
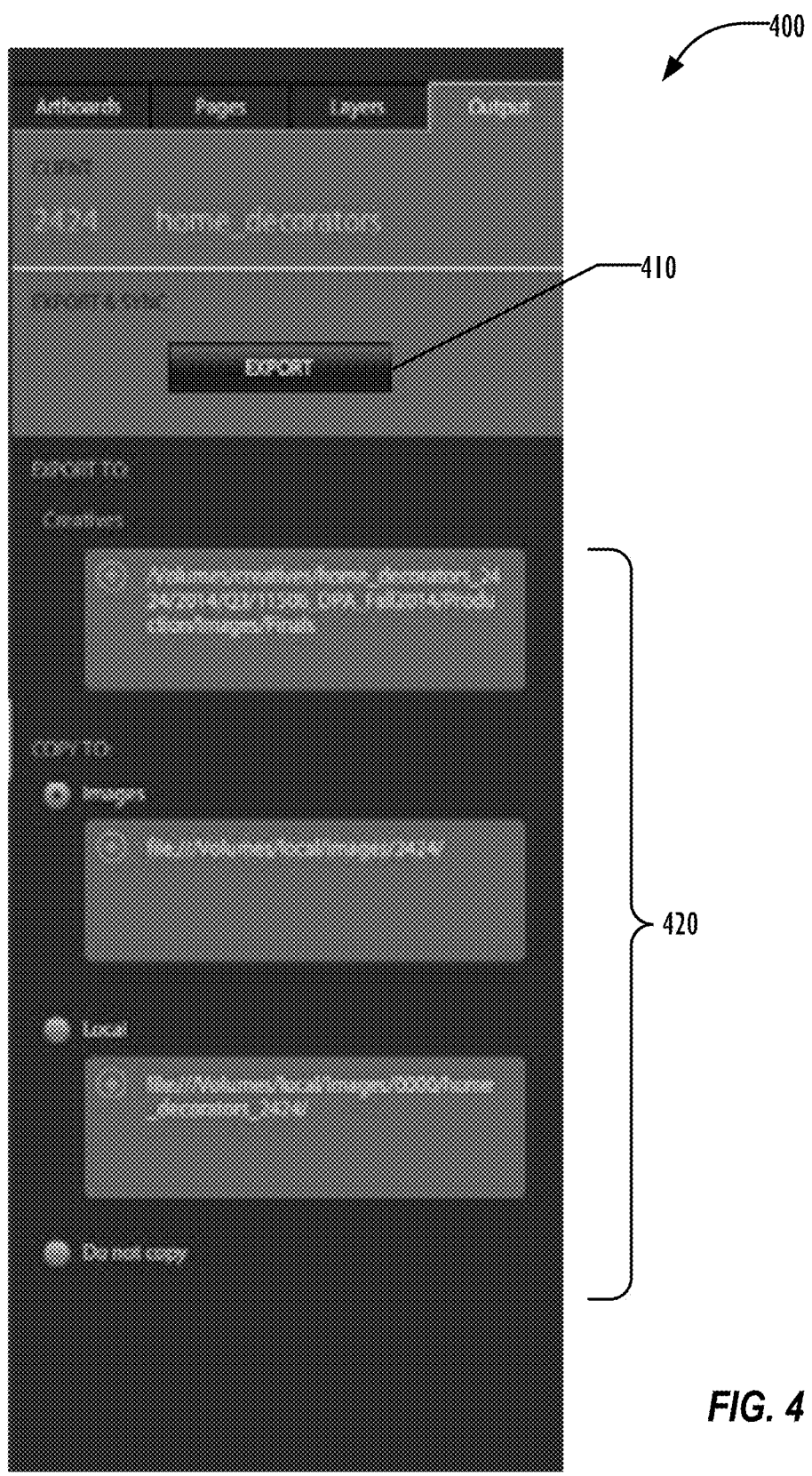
Figure 5:
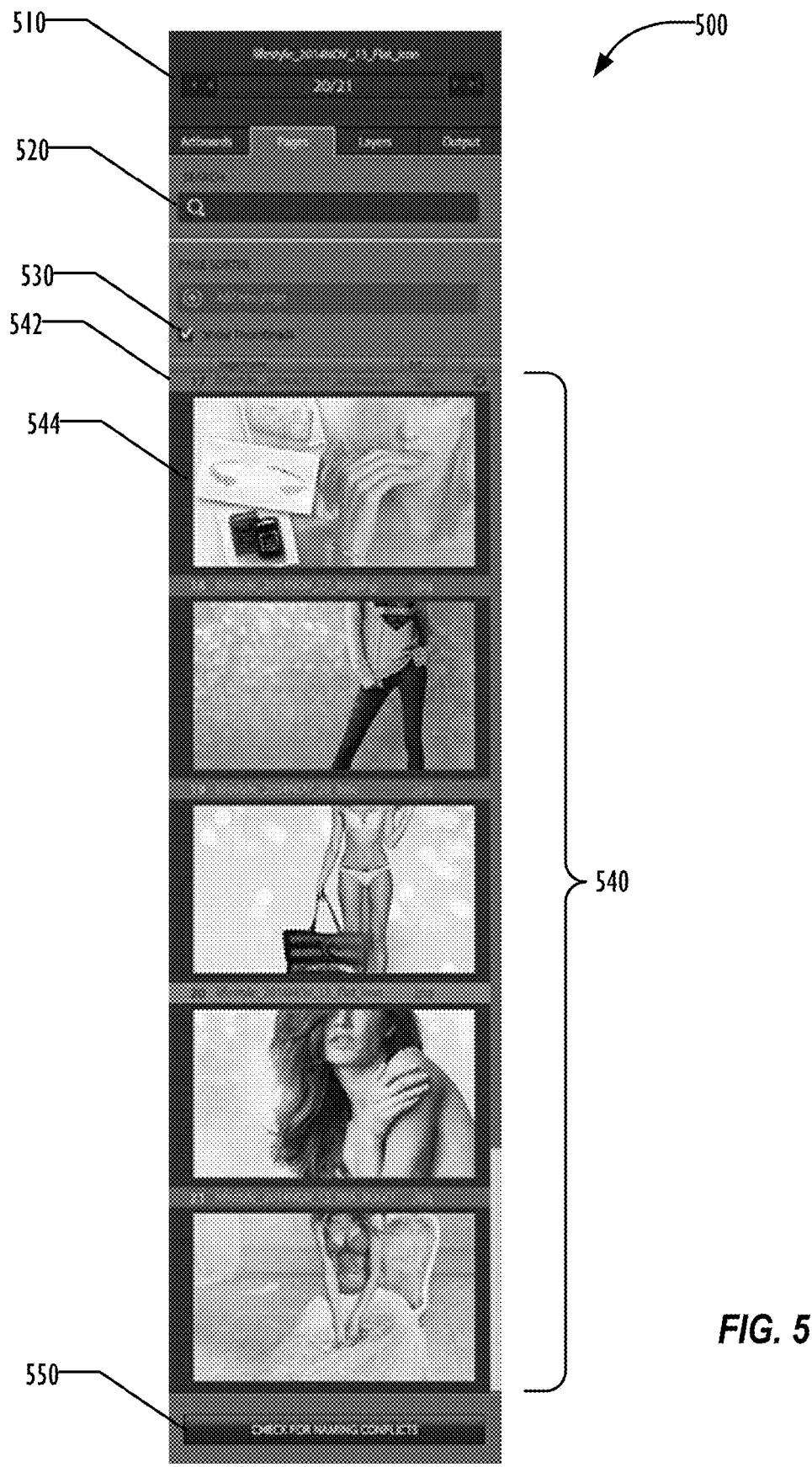

FIGS. 3-5 are screenshots according to one embodiment that illustrate, respectively, a layers panel 300, an output panel 400, and a pages panel 500, each of which appears upon selection of their corresponding tabs 220-240.

The layers panel 300 provides for separate treatment of various assets which are to comprise the image, including overlay control inputs 310, main image control inputs 320, and underlay control inputs 330. The manipulation of such layers is enabled by separating or cutting the image into separate assets, e.g., a background image as one asset, a brand name as another asset, a separate text line as a further asset, and so on. Each asset must have a main layer; the overlay and underlay layers are optional. Each such asset is cut or separated by being placed into a separate file that is stored on or otherwise accessible by an asset server, so that the assets can be manipulated independently. Each of the control inputs 312, 314, and 316 control image dimensions, scale and rotation for the given layer being manipulated. In addition, a filename ("Page name") area 305 allows naming the page, which in the illustrated embodiment can be saved either in jpg or png format. In one embodiment, additional controls may be provided, such as a button 313 to allow showing or hiding the particular layer, a button 315 to lock the layer, a button 317 to allow copying the layer and pasting into another layer, and a delete button 319 to delete the layer. Each ad size on the artboard canvas 211 may have separate instances of these controls.

Figure 6:
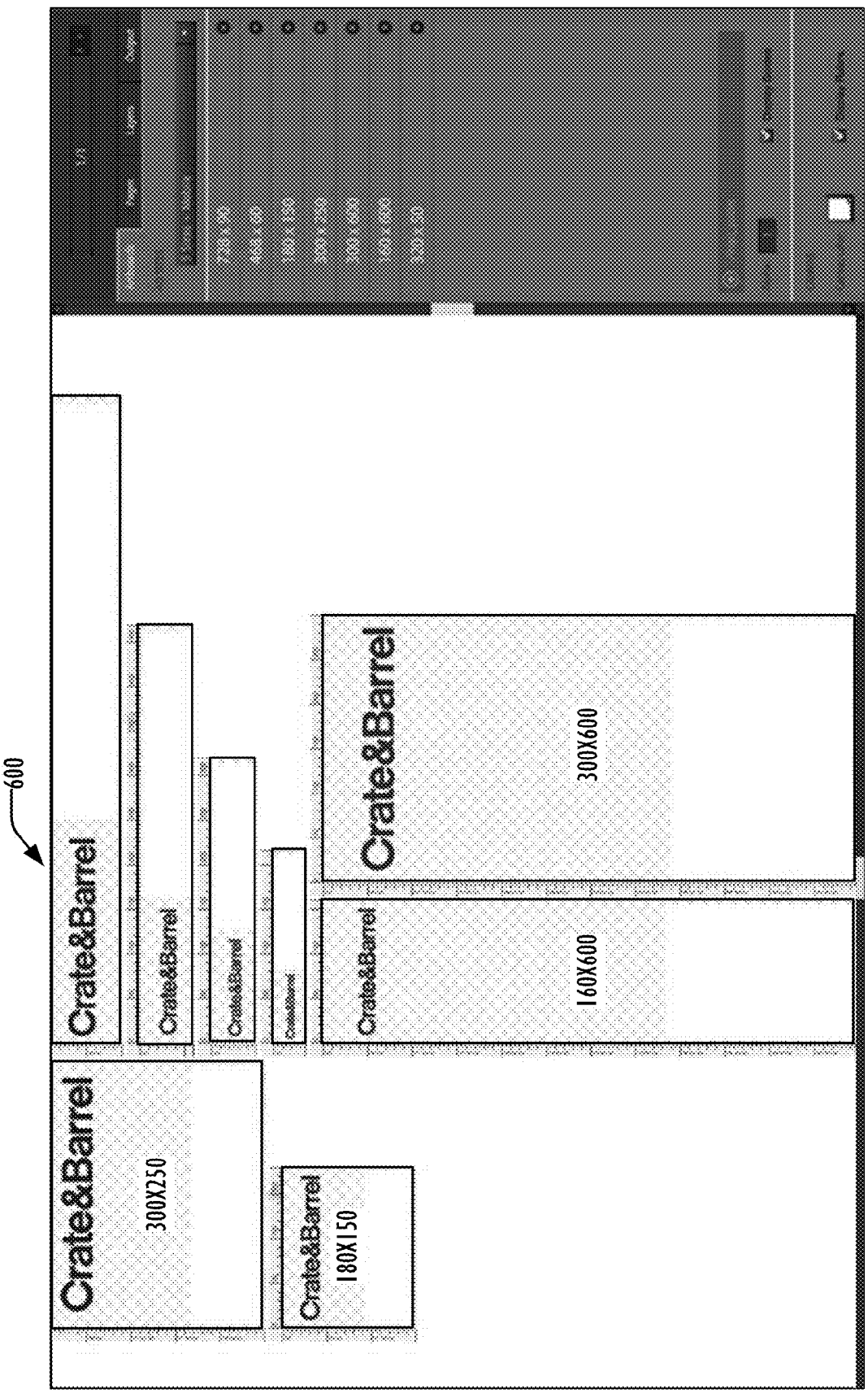
FIG. 6 is a screenshot that illustrates overlay guides for displaying where logos and copy may be positioned in artboards according to one embodiment.

FIG. 6 is a screenshot 600 illustrating an example of an overlay, which may include a promotional graphic, such as the brand name, logo, or other copy to be associated with the pictorial portion of the advertisement. However, as illustrated by the example of the overlay assets presented, moving overlay or underlay assets around in the artboard 214 depending upon the size of the resulting image may be aesthetically desirable. Thus, as illustrated in FIG. 3, the overlay control inputs 310, main image control inputs 320 and underlay control inputs 330 allow for the independent manipulation (e.g., adjustment and locking) of each layer for each of the different artboards 214 in the artboard panel 211. In one embodiment, each different ad size may employ a different overlay and a different underlay, which in some embodiments is identified by incorporating the ad size into the filename of the overlay or underlay for that ad size.

Once the composition is arranged to the satisfaction of the user, the resulting assets may then be saved or exported as a file, e.g., in .jpg or .png format. Each different ad size may be saved as a separate asset file. The saved assets may be saved locally on the computer system executing the asset manipulation tool or may be saved remotely on a server accessed via a network.

In the embodiment illustrated in FIG. 4, once the graphic designer or other user is satisfied by the composition of the rendered assets, the user can export the resulting assets using the output panel 400. The output panel includes an export control 410 and destination controls 420 which allow the user to export the images to a creatives server, and optionally copy the creatives to a local drive or some other targeted location. In one embodiment, each different size asset is stored separately from each other size in a directory on the creatives server defined for that particular ad size.

As illustrated in the screenshot of FIG. 5 according to one embodiment, the pages panel 500 allows a user to review thumbnails or previews of rendered images for review or deletion as desired. These are the images that are then loaded into the artboards 214 and automatically scaled and positioned based on the size of the artboard 214. In one embodiment, a user may use control 510 to quickly scroll through the user's pages. Control 520 may provide the user with the ability to search for specific images in a project. As illustrated in FIG. 5, thumbnails of images may be displayed in a thumbnail area 540 if a "Show Thumbnails" checkbox 530 is checked. In one embodiment, each thumbnail image in the thumbnail area 540 contains two parts: a thumbnail header 542, giving the name of the page displayed in thumbnail display area 544. In one embodiment, hovering over the thumbnail header 542 causes a user interface to allow deleting of renaming the page. A naming conflicts button 550 allows checking to see if the file name of the selected thumbnail already exists on a local disk drive.

Figure 8:
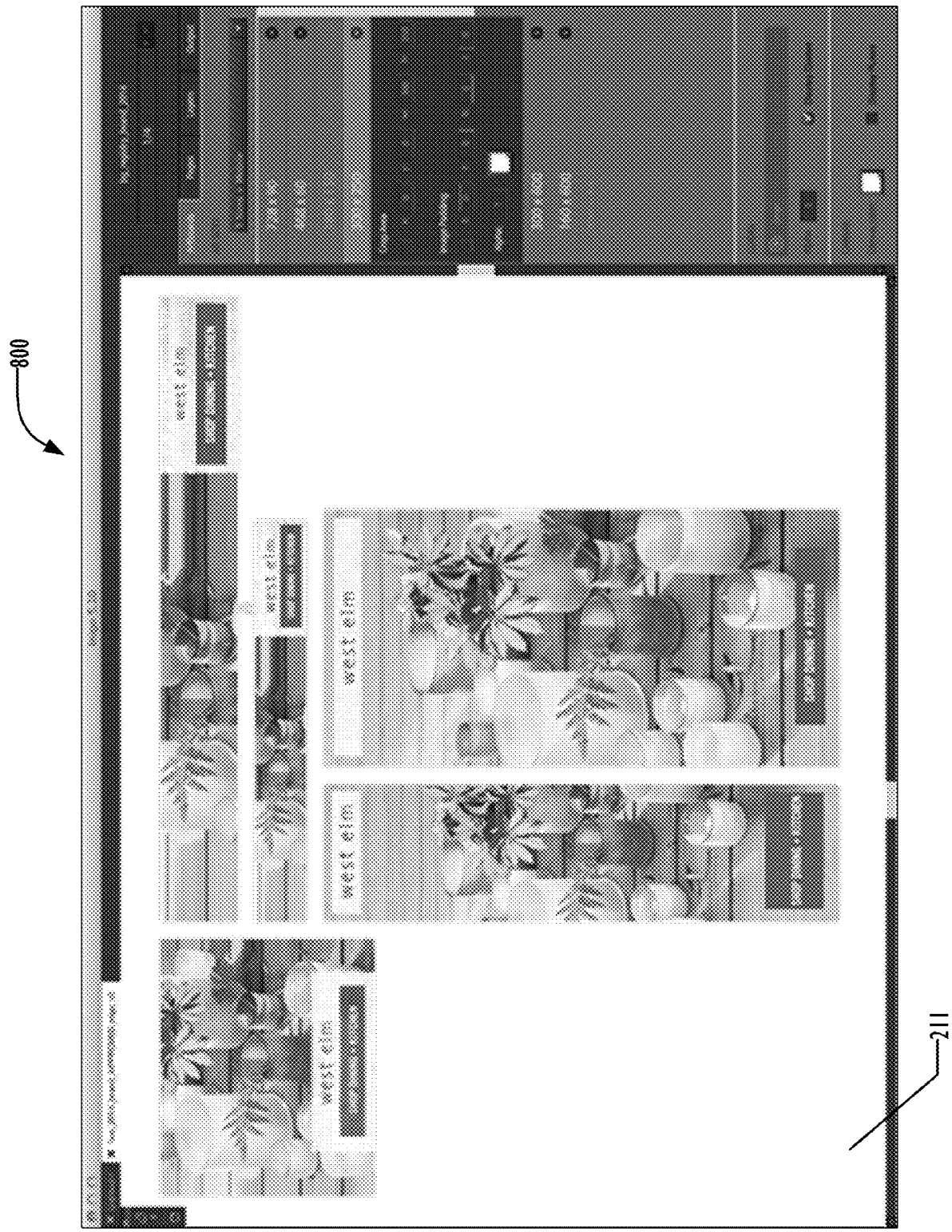
FIG. 8 is a screenshot that illustrates example assets generated with the batch processing tool in accordance with one embodiment.

Thus, as shown by the example composite images of FIG. 8, the various embodiments disclosed herein provide for the efficient batch creation and processing of a set of online advertisements, each advertisement comprising its own distinct composition of multiple assets. As illustrated in the screenshot 800 of FIG. 8, the artboard canvas 211 displays five artboards in which the same image has been automatically scaled and positioned in the five artboards, each including an overlay layer with ad copy. By using the techniques described above, this collection of assets can be created much faster than by creating each asset of a different ad size separately. Yet the collection of assets can be exported and saved separately, allowing the appropriate ad size to be served as desired.

Figure 9:
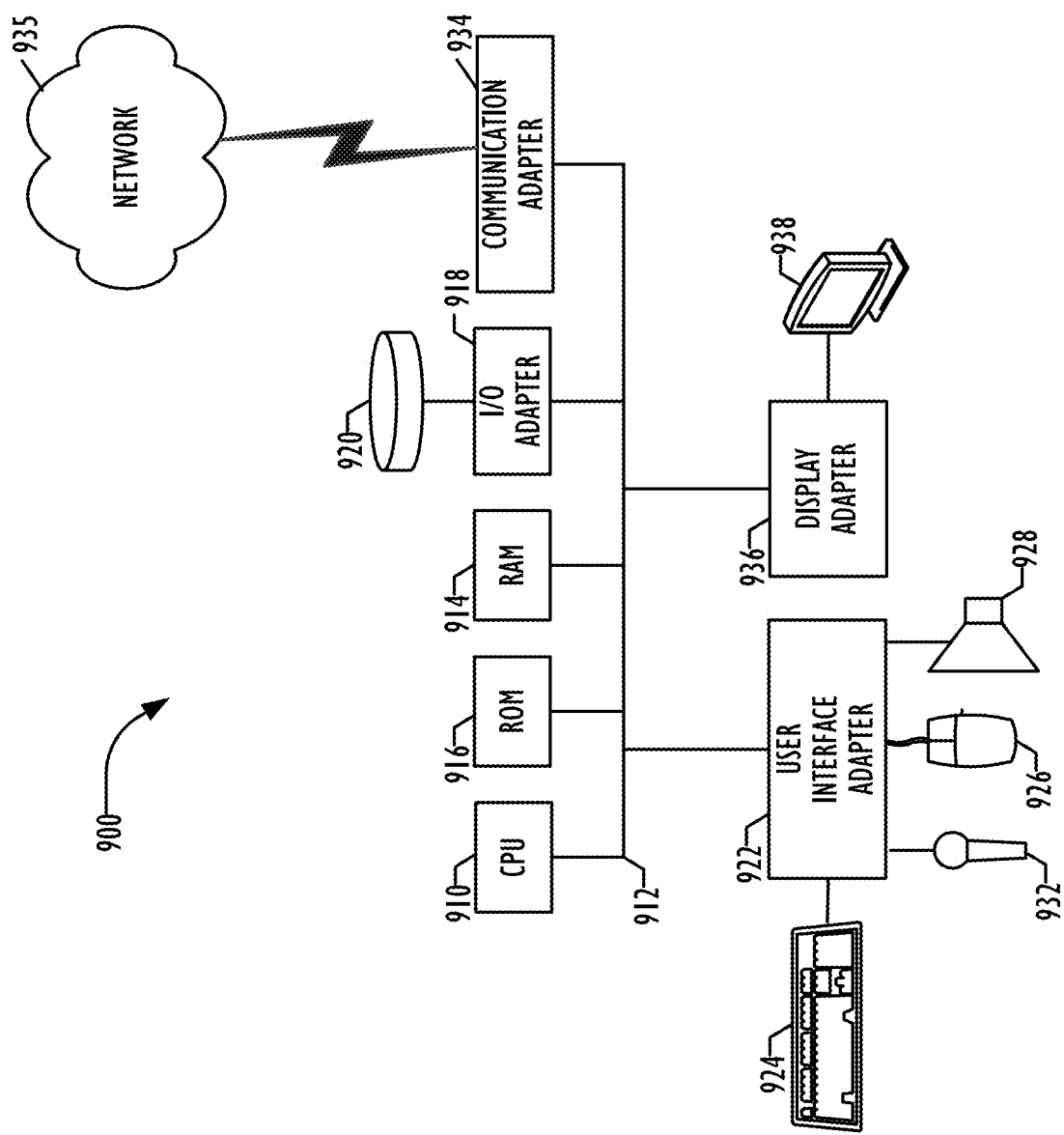
FIG. 9 is a block diagram that illustrates a computer system on which embodiments disclosed herein may be implemented.

FIG. 9 is a block diagram illustrating a computer system on which functionality described above may be implemented according to one embodiment. FIG. 9 illustrates a typical hardware configuration of a workstation 900 having a central processing unit or processor 910, such as a microprocessor, and a number of other units interconnected via a system bus 912.

The workstation shown in FIG. 9 includes a Random Access Memory (RAM) 914, Read Only Memory (ROM) 916, an I/O adapter 918 for connecting peripheral devices such as disk storage units 920 to the bus 912, a user interface adapter 922 for connecting a keyboard 924, a mouse 926, a speaker 928, a microphone 932, and/or other user interface devices such as a touch screen (not shown) to the bus 912, a communication adapter 934 for connecting the workstation to a communication network 935 (e.g., a data processing network), and a display adapter 936 for connecting the bus 912 to a display device 938. These elements and components are illustrative and by way of example only, and any desired computer architecture may be used with these or other components and elements. Although only one of each type of element is illustrated in FIG. 9, more than one of each type may be incorporated into the computer 900 as desired.

Storage unit 920 represents any form of non-volatile storage including, but not limited to, all forms of optical and magnetic, including solid-state, storage elements, including removable media, and may be internal to or external to the computer system 900, including networked storage units provided remotely. Storage unit 920 may be used for storage of software comprising instructions that when executed by the processor 910 cause the processor 910 to perform the programmed actions, data for use by the computer 900, or both.

Although some of the Figures described above illustrate a workstation running the Apple OS X operating system, the workstation may have resident thereon any desired operating system. Embodiments may also be implemented on platforms and operating systems other than those mentioned herein. Embodiments may be written using any desired programming language, typically using an object oriented programming methodology.

FIG. 10 is a block diagram illustrating a networked system for providing the functionality described above. Workstation 1010 is typically a computer on which the software providing the functionality described above is installed. However, in some embodiments, the workstation 1010 allows a user to execute software installed remotely on another computer, such as the server 1030, accessing the server 1030 via a network 1020. The network 1020 may be a single network or a collection of interconnected networks, including the Internet, and any desired communications techniques may be used for the network traffic. In one embodiment, creatives and other files created or modified as described above may be stored on a storage unit or units 1040 that is connected locally or remotely to the server 1030, allowing the server to provide those files to the workstation 1010. Although illustrated as a desktop-type computer, workstation 1010 may be any suitable type of computational device, including a laptop or a tablet.

Any type of logic may be utilized which is capable of implementing the various functionality set forth herein including hardware, firmware, software, or any desired combination thereof.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A non-transitory computer readable medium on which are stored instructions, comprising instructions that when executed cause a computer to:
   select a plurality of predefined different online ad sizes for a same online advertising campaign;
   select an asset to be rendered in the plurality of predefined different online ad sizes;
   display a plurality of artboards on an artboard canvas of a user interface, each of the plurality of artboards corresponding to one of the plurality of predefined different online ad sizes; and
   perform a batch process of simultaneously and automatically scaling and positioning an image of the asset into the plurality of artboards by, for each of the plurality of artboards:
      rescaling the image to fill a corresponding cropping area by calculating a width scaling factor and a height scaling factor, and rescaling the image by the larger of the width scaling factor and the height scaling factor, and
      positioning the rescaled image in the corresponding cropping area about one of a center point of the corresponding cropping area and a user specified center point,
   wherein the batch process generates, from the asset, a plurality of different sized assets corresponding to the plurality of predefined different online ad sizes.

2. The computer readable medium of claim 1, wherein the instructions further comprise instructions that when executed cause the computer to:
   export the plurality of artboards as a plurality of assets of the plurality of predefined online ad sizes.

3. The computer readable medium of claim 2, wherein the instructions that when executed cause the computer to export the plurality of artboards comprise instructions that when executed cause the computer to export the plurality of artboards to a creatives server and, in response to input from a user, export the plurality of artboards to a second location.

4. The computer readable medium of claim 1, wherein the instructions further comprise instructions that when executed cause the computer to:
   crop the asset in an artboard of the plurality of artboards independent of other artboards of the plurality of artboards.

5. The computer readable medium of claim 1, wherein the instructions further comprise instructions that when executed cause the computer to:
   overlay a plurality of overlay assets of the plurality of predefined different online ad sizes onto correspondingly sized artboards of the plurality of artboards.

6. The computer readable medium of claim 1, wherein the instructions further comprise instructions that when executed cause the computer to:
   underlay a plurality of underlay assets of the plurality of predefined different online ad sizes onto correspondingly sized artboards of the plurality of artboards.

7. The computer readable medium of claim 1, wherein the instructions further comprise instructions that when executed cause the computer to:
   define an online ad size for inclusion as one of the plurality of predefined different online ad sizes.

8. The computer readable medium of claim 1, wherein the instructions that when executed cause the computer to select a plurality of predefined different online ad sizes comprise instructions that when executed cause the computer to:
   select a plurality of predefined different online ad sizes corresponding to an advertising venue.

9. The computer readable medium of claim 1, wherein the instructions that when executed cause the computer to select an asset to be rendered in the plurality of predefined different online ad sizes comprise instructions that when executed cause the computer to:
   display a scrollable plurality of thumbnails of assets; and
   select an asset corresponding to a selected thumbnail.

10. The computer readable medium of claim 1, wherein the instructions that when executed cause the computer to display a plurality of artboards on an artboard canvas comprise instructions that when executed cause the computer to:
    reposition the artboards on the artboard canvas under user control.

11. A method of preparing online advertisements, comprising:
    selecting a plurality of predefined different online ad sizes for a same online advertising campaign in a user interface of a computer system;
    selecting an asset for rendering in the plurality of predefined different online ad sizes in the user interface; and
    performing a batch process by the computer system of simultaneously and automatically scaling and positioning an image of the asset into a plurality of artboards comprising artboards of the plurality of predefined different online ad sizes by, for each of the plurality of artboards:
       rescaling the image to fill a corresponding cropping area by calculating a width scaling factor and a height scaling factor, and rescaling the image by the larger of the width scaling factor and the height scaling factor, and
       positioning the rescaled image in the corresponding cropping area about one of a center point of the corresponding cropping area and a user specified center point,
    wherein the batch process generates, from the asset, a plurality of different sized assets corresponding to the plurality of predefined different online ad sizes.

12. The method of claim 11, further comprising:
    saving the plurality of artboards as a plurality of assets of the plurality of predefined different online ad sizes.

13. The method of claim 12, wherein saving the plurality of artboards comprises:
    saving the plurality of artboards to a creatives server; and
    saving the plurality of artboards to a second user-defined location.

14. The method of claim 11, further comprising:
    cropping the asset in an artboard of the plurality of artboards independently of the other artboards of the plurality of artboards.

15. The method of claim 14, further comprising:
    copying the cropped asset from a first artboard of the plurality of artboards to a second artboard of the plurality of artboards, automatically scaling and positioning the cropped asset in the second artboard.

16. The method of claim 11, further comprising:
    layering a plurality of layer assets of the plurality of predefined different online ad sizes onto correspondingly sized artboards of the plurality of artboards.

17. The method of claim 11, wherein selecting a plurality of predefined different online ad sizes comprises:
   selecting a predefined plurality of predefined different online ad sizes corresponding to an advertising venue.

18. The method of claim 11, further comprising:
   displaying the plurality of artboards on an artboard canvas of the user interface of the computer system, automatically arranged on the artboard canvas.

19. The method of claim 18, further comprising:
   repositioning the artboards on the artboard canvas under user control.

20. The method of claim 11, further comprising:
   customizing characteristics of the plurality of artboards.

* * * * *